United States Patent [19]

Amberntsson et al.

[11] 4,095,237
[45] June 13, 1978

[54] INK JET PRINTING HEAD

[75] Inventors: Jan Roger Amberntsson; Roger Ingemar Andersson, both of Angered; Stig Bertil Sultan, Floda, all of Sweden

[73] Assignee: Aktiebolaget Electrolux, Sweden

[21] Appl. No.: 668,301

[22] Filed: Mar. 19, 1976

Related U.S. Application Data

[63] Continuation of Ser. No. 536,553, Dec. 26, 1974, abandoned.

[51] Int. Cl.² ............................................. G01D 15/16
[52] U.S. Cl. .................................................. 346/140 R
[58] Field of Search ..................................... 346/140, 75

[56] References Cited

U.S. PATENT DOCUMENTS

| 3,247,519 | 4/1966 | Sihvonen | 346/140 A |
| 3,708,798 | 1/1973 | Hildenbrand | 346/140 |
| 3,747,120 | 7/1973 | Stemme | 346/140 X |
| 3,831,727 | 8/1974 | Kruspe | 346/140 X |

Primary Examiner—Joseph W. Hartary
Attorney, Agent, or Firm—Alfred E. Miller

[57] ABSTRACT

An ink supply to a movable printing head in which the liquid reservoir follows the printing head in its movement along a recording medium and communicates with the liquid pumping chambers by means of at least one channel located in the printing head. In one embodiment, a filter is located in the flow path of the liquid reservoir to the pump chambers while in another embodiment the filter is disposed within the reservoir.

5 Claims, 3 Drawing Figures

INK JET PRINTING HEAD

This application is a continuation of U.S. application Ser. No. 536,553, filed 12/26/74, now abandoned.

BACKGROUND OF THE INVENTION

In known ink jet printing devices the printing liquid used is conveyed from a liquid reservoir to the movable printing head by means of flexible hoses. The printing head moves at a considerable speed and is subject to large accelerations and decelerations at the end positions of movement of the printing head. Because of this action it has not been possible to avoid discontinuity in operation when utilizing a liquid reservoir that moves together with the printing head along a recording medium. This discontinuity occurs because the rapid movements of the printing head and associated liquid reservoir cause agitation of the liquid resulting in air being mixed with the liquid. Furthermore, there has been no success in arranging for effectively damping the strong movement of the liquid. Liquid reservoirs of the above type have not been effectively used since there is an absolute requirement of absence of air in the printing liquid in order for the printing head to effectively function.

The present invention relates to a printing head for an ink jet printer in which the ink from the various pump chambers is conveyed to a nozzle whereby ink droplets are propelled onto a print medium.

SUMMARY OF THE INVENTION

The present apparatus is such that the printing liquid is supplied to the movable printing head without the use of hoses.

It is an object of the present invention to provide a printing head with an associated liquid reservoir which follows the movement of the printing head along the recording medium and which communicates with the various pump chambers, such as piezoelectric pump arrangements, by at least one channel in the printing head.

A further object of the present invention is to provide a filter positioned in the flow path of the printing liquid from the reservoir to the pump chambers.

Another object of the present invention is to provide a liquid reservoir for a printing head in which the filter is located in the reservoir and either partly or totally fills the reservoir.

A further object of the present invention is to provide a porous filter in which the size of the pores can be selected in order to cause the filter to function as an effective damper of the liquid movements in the reservoir.

The invention will now be more fully described with reference to the accompanying drawings in which.

PREFERRED EMBODIMENTS OF THE INVENTION

Figure 1:
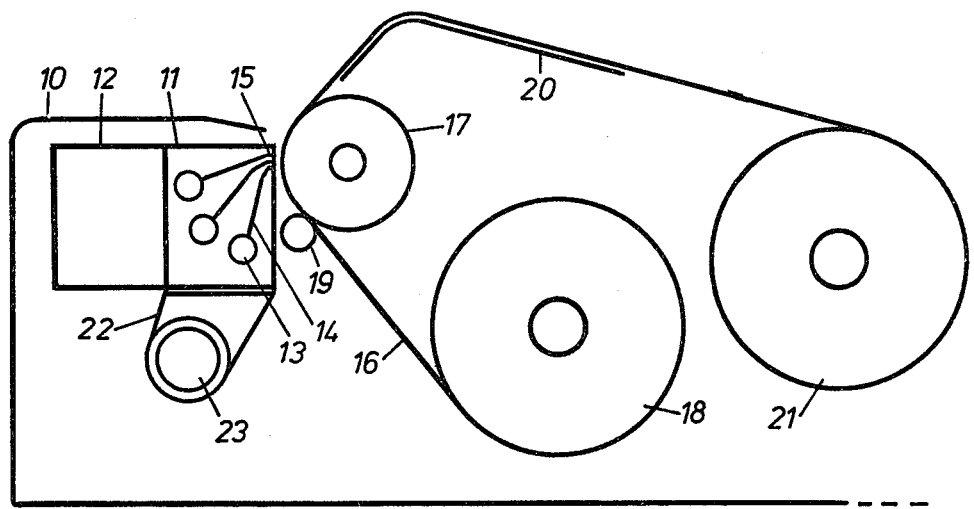
FIG. 1 is a diagrammatic view of an ink jet printer having a printing head constructed in accordance with the teachings of the present invention.

Referring to FIG. 1, a housing 10 is shown having an ink jet printer assembly therein. Located within the housing 10 is a printing head 11 which is attached to a liquid reservoir 12 and is preferably integral therewith. The pump chambers located in the printing head 11 are provided with pumping means in the form of piezoelectric crystals 13. Furthermore, each pump chamber is provided with an ink channel 14 opening into a capillary nozzle 15. The printing liquid in the form of droplets are propelled out of the nozzles 15 on to a print medium, for example paper tape 16 unwound from the supply roll 18. The tape 16 passes between the press roller 19 and the rotary roller 17 and continues on through the paper guide 20 to be wound on the reel 21.

The printing head 11 is secured to a support 22 which in turn is slidably mounted on a shaft 23. Moreover, the printing head 11 is adapted to be moved laterally adjacent to the roller 17 by means of a driving device (not shown).

Figure 2:
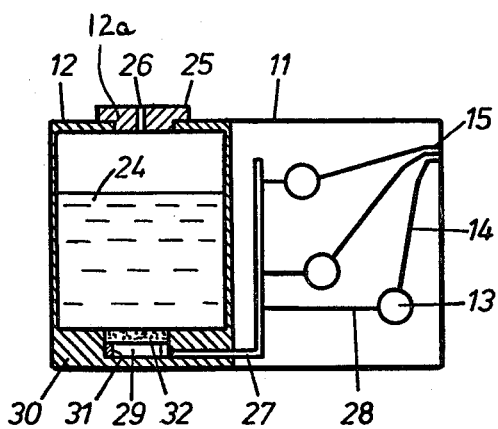
FIG. 2 is an enlarged side elevational view, partly in section, of the printing head illustrated in FIG. 2

Referring now to FIG. 2 in which the printing head 11 is shown in greater detail, the liquid 24 is supplied to the reservoir 12 by an opening 12a in the top of the reservoir. This opening is closed by means of a plug 25 having an air inlet channel 26. A conduit 27 is shown for conveying the liquid present in the reservoir 12 through additional channels 28 to the respective pump chambers of the printing head 11.

The conduit 27 has a part thereof in the bottom surface 30 of the reservoir which communicates by means of an enlarged bore 29 with the interior of the reservoir. An annular support 31 is shown upon which a filter 32 rests. It will be noted that the filter is located within the bore 29 and the filter is constituted of a foamed material, such as a foam rubber or a foam plastic. Furthermore, the pores of the filter are dimensioned to serve as capillaries for the liquid 24. It should be apparent that the capillaries of the filter will always be filled with liquid resulting in an arrangement in which no air can pass through the filter 32 to the channel 27. This is so because the capillary force is of sufficient magnitude that air cannot pass through the filter 32 to the channel 27 even if the filter is in contact with air for a long period of time. A long period of air contact may occur when the present ink jet printer is moved from one location to another. Further, the filter may be occasionally laid free at high acceleration of the printing head in the condition where the quantity of liquid in the reservoir is small.

Figure 3:
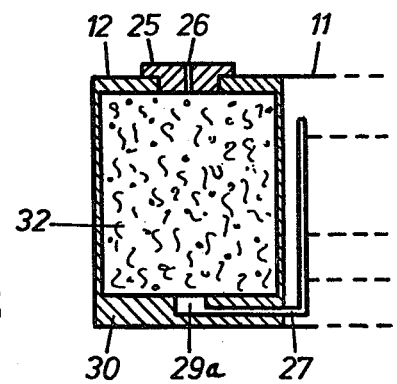
FIG. 3 is a sectional view of another embodiment of the printing head shown in FIG. 2.

Another construction of the reservoir 12 is shown in FIG. 3. In this structure the filter is not positioned in the bore 29 as in FIG. 2 but is actually in the reservoir 12 which it fills completely. However, it is to be noted that it is possible to arrange the filter to fill the reservoir 12 only partially. In this arrangement the filter has a considerable vertical height and therefore the static pressure of the liquid, when the filter is filled with liquid contributes to the transport of the printing liquid to the bore 29a and then through the conduit 27 to the respective pump chambers. In the present embodiment, however, the reservoir cannot be completely emptied of liquid as is the case with the construction shown in FIG. 2.

Referring to FIG. 3, the filter mass 32 serves as a very effective damper of the movements of the liquid in reservoir 12. Moreover, the pores in the filter 32 can be larger than the pores in the filter shown in FIG. 2. Furthermore, there is a possibility of a comparatively free choice of suitable filter material for the filter 32 without any risk of air passing through the filter to the conduit 27.

The present printing head construction results in the absolute absence of air in the printing head arrangement as well as providing means for effectively damping the movement of the liquid during the rather rapid movements of the printing head.

What is claimed is:

1. An ink jet printer having a movable printing head provided with a plurality of pumping chambers, said printing head being movable adjacent to a recording medium, an outlet channel for each of said pumping chambers terminating adjacent to said recording medium comprising a liquid reservoir moving and coacting with said printing head, at least one conduit communicating with said reservoir with the respective pumping chambers, a housing mounting said movable printing head and associated liquid reservoir for simultaneous movement therewith, and a foamed material element located in the flow path of the liquid from said reservoir to said pumping chambers, said element being constituted of porous material, the pores of which form capillaries for said liquid and prevent the passage of air into said conduit.

2. An ink jet printer as claimed in claim 1 wherein said element is positioned adjacent to the inlet of said conduit.

3. An ink jet printer as claimed in claim 1 further comprising an enlarged bore in the bottom of said reservoir, said element being located in said bore, and the latter being connected to said conduit.

4. An ink jet printer as claimed in claim 1 wherein said foamed material element is foam rubber.

5. An ink jet printer as claimed in claim 1 wherein said foamed material element is foamed plastic.

* * * * *